Sept. 11, 1962 C. O. HOLMBERG, JR., ETAL 3,053,405
APPARATUS FOR REARRANGING BUNDLES OF LUMBER
Filed Dec. 19, 1958 3 Sheets-Sheet 1

INVENTORS
CARL O. HOLMBERG, JR.
GEORGE I. FERGUSON, JR.
BY Krazinski & Nolan
ATTORNEYS

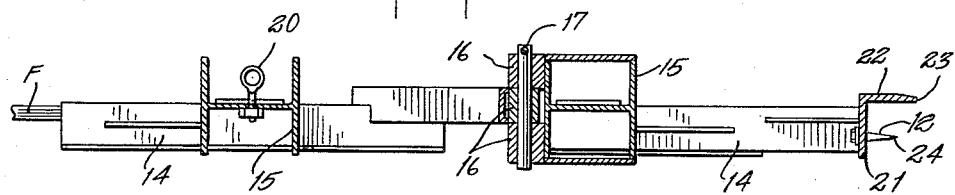
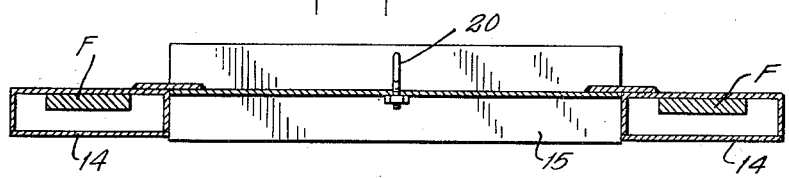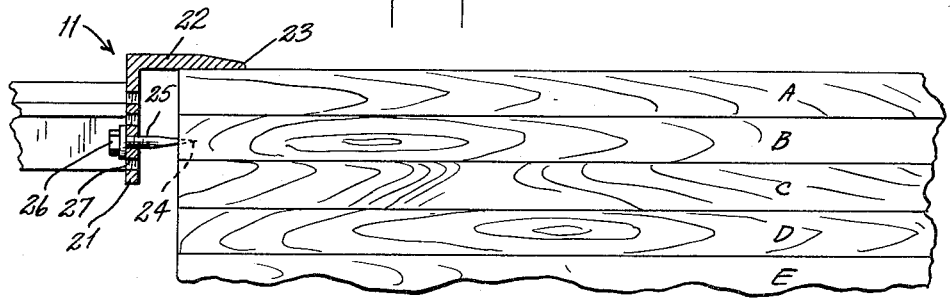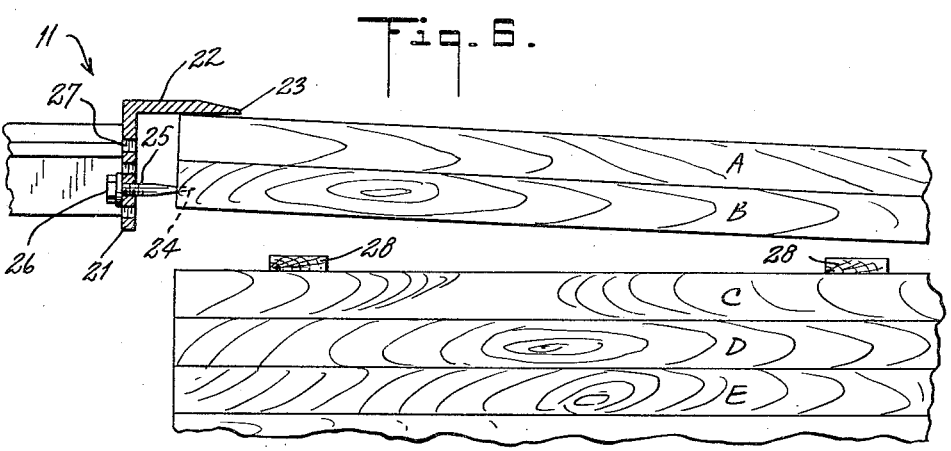

Sept. 11, 1962   C. O. HOLMBERG, JR., ETAL   3,053,405
APPARATUS FOR REARRANGING BUNDLES OF LUMBER
Filed Dec. 19, 1958   3 Sheets-Sheet 3

INVENTORS
CARL O. HOLMBERG, JR.
GEORGE I. FERGUSON, JR.
BY
Krazinski & Nolan
ATTORNEYS 3,053,405
APPARATUS FOR REARRANGING
BUNDLES OF LUMBER
Carl O. Holmberg, Jr., 6 Ridge Ave., and George I. Ferguson, Jr., 21 1st Ave., both of Little Falls, N.J.
Filed Dec. 19, 1958, Ser. No. 781,717
7 Claims. (Cl. 214—620)

The present invention relates to article or material handling apparatus and, more particularly, to a method of and apparatus for rearranging layers of lumber.

The present practice is to deliver large bundles of lumber to the lumber yard. Such bundles are generally rectangular in shape and comprise pieces of lumber of the same size and shape which are arranged in adjacent vertical stacks and horizontal rows and are strapped together to facilitate handling the bundles during transportation thereof.

When the bundles have been placed in the lumber yard, the straps are broken and removed. The rows or layers of lumber are then separated to prevent moisture in the lumber or atmospheric moisture which gets between the pieces of lumber, while stored in the yard, from causing the lumber to rot or be otherwise damaged. Such separation is accomplished by manually removing the lumber piece by piece from the opened bundle and building up near the bundle another pile of adjacent vertical stacks and horizontal rows with separating strips placed crosswise between at least every other pair of adjacent horizontal rows. Since these bundles of lumber usually weigh between one and five tons, depending on the length which varies from 8 feet long to about 24 feet long, the manual labor required to move such a large mass is time consuming, costly and tiresome.

Accordingly, an object of the present invention is to provide apparatus for rearranging layers in bundles or piles of lumber in situ which reduces the requirement of manual labor to a minimum and which also reduces the required yard space.

Another object is to provide such apparatus which can be adjusted to handle pieces of lumber of various dimensions.

Another object is to provide such apparatus which can be operated by a conventional power driven lift truck.

A further object is to accomplish the foregoing in a simple, rapid, practical and economical manner.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by straightening the ends of a layer or row of lumber, simultaneously seizing all the ends of lumber in a straightened row, lifting the seized row of lumber to raise it above an adjacent row beneath it, and inserting spacing means between the adjacent rows to separate the same.

Suitable apparatus for carrying out these operations comprises a pusher bar having straight edge means for straightening the lumber and a row of pins adjacent the straight edge means for piercing and seizing the lumber. These elements are mounted on a frame adapted to be carried on the fork of a lift truck for effecting horizontal and vertical movement of the bar and the pins.

A preferred embodiment of the invention has been chosen for purposes of illustration and description and is shown in the accompanying drawing, forming a part of the specification, wherein:

FIG. 3 is a sectional view taken along the line 3—3 on FIG. 2.

FIG. 4 is a sectional view taken along the line 4—4 on FIG. 2.

FIGS. 5, 6 and 7 are further enlarged fragmentary sectional views illustrating the operation of the apparatus.

Figure 8:
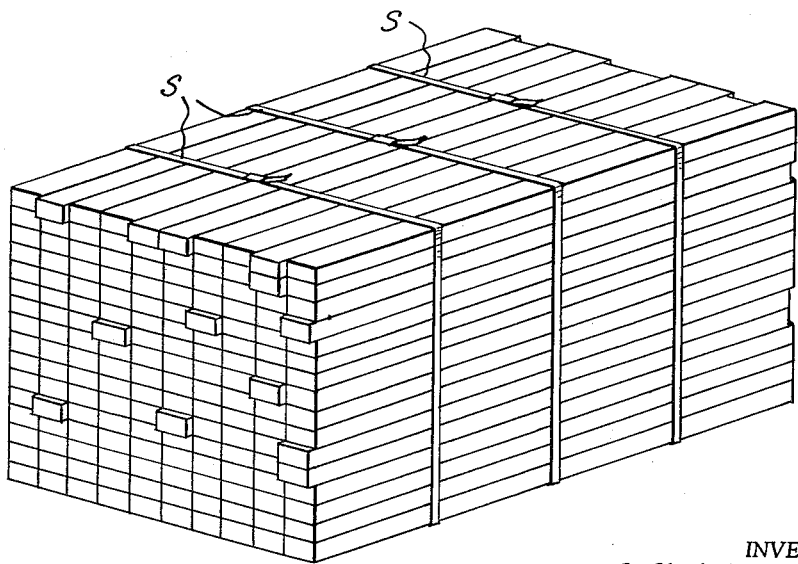
FIG. 8 is a perspective view of a strapped bundle of lumber, as originally delivered to a lumber yard.

Referring to the drawings in detail, a bundle of lumber is shown in FIG. 8 which comprises pieces of lumber arranged in adjacent vertical stacks and horizontal rows. The pieces of lumber shown by way of example are two-by-fours cut to a length of twenty-four feet. Such a bundle of lumber weights about five tons.

The bundle is held together by steel straps S to facilitate transportation and handling thereof, and is delivered to a lumber yard in this condition. As already indicated, the straps S are removed at the lumber yard and the lumber pieces are separated to prevent moisture damage or dry rot during storage.

Figures 1, 2:
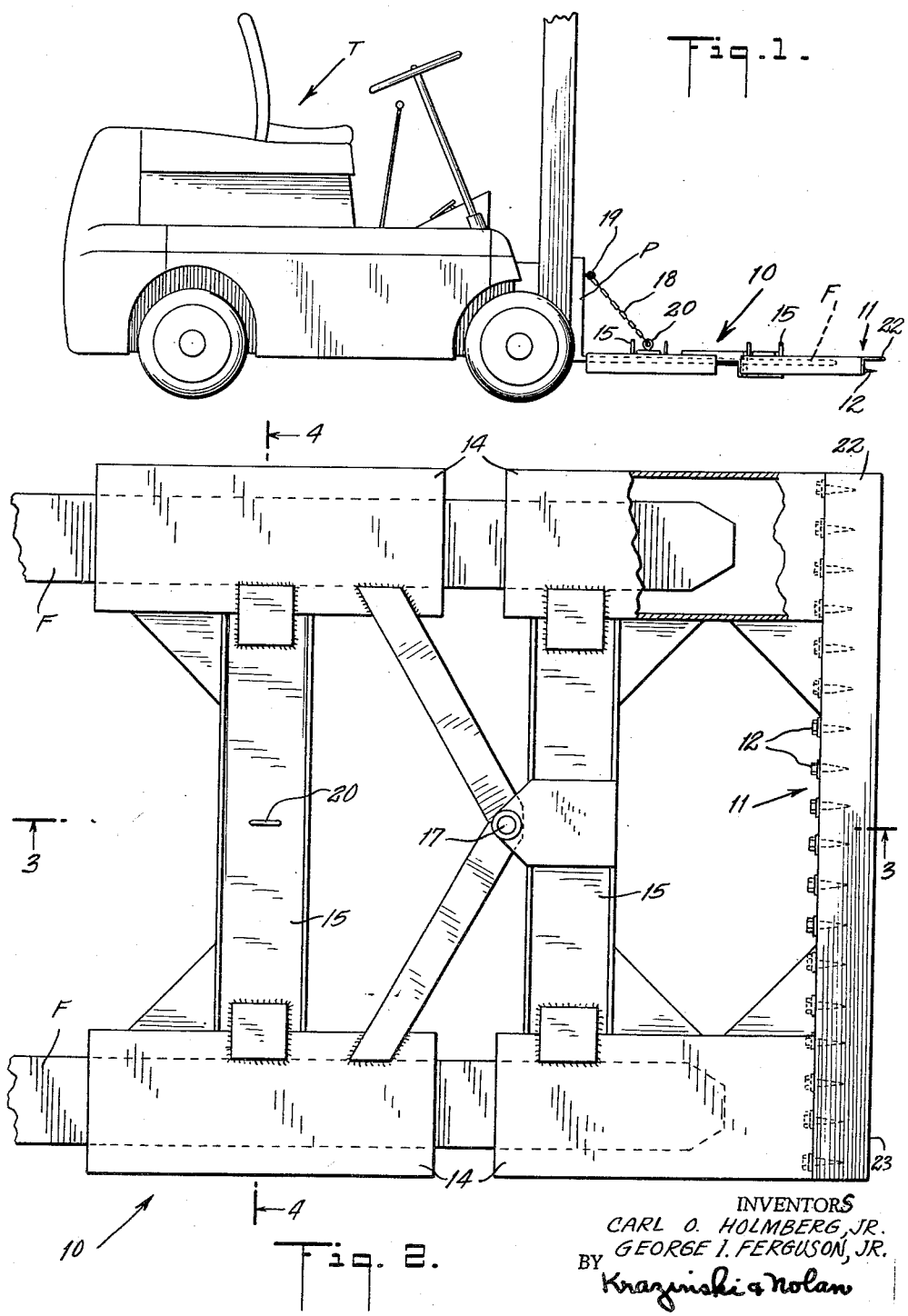
FIG. 1 is a side elevational view of a lift truck provided with apparatus in accordance with the present invention.
FIG. 2 is an enlarged plan view of the apparatus shown in FIG. 1.

The apparatus in accordance with the present invention is shown in FIGS. 1 to 4 and, as shown in FIG. 1, this apparatus is adapted to be mounted on the fork F of a conventional power operated lift truck T, such a truck being well known and not requiring any description in order to understand the present invention.

Generally described, the apparatus comprises a frame 10, a pusher bar 11 at the forward end of the frame, and a row of pins 12 mounted on the pusher bar.

The frame 10 comprises rectangular tubular side members 14 for receiving the prongs of the fork F of the lift truck T, and crosswise extending members 15 for securing the side members in parallel, spaced relation. Preferably, the frame has front and rear sections which are pivotally connected by lugs 16 and a pin 17 (FIG. 3) to enable the front section to adjust itself with respect to the bundle of lumber as will be understood from the description of the operation of the apparatus. The rear ends of the side members 14 of the rear frame section are pushed against the vertical backing plate P of the fork F and are retained in this position by a chain 18 having one end connected to an eye-bolt 19 on the plate P and its other end connected to an eye-bolt 20 on the crosswise member 15 of the rear frame section.

The pusher bar 11 may be an angle member having a vertical flange 21 secured to the forward end of the front frame side members 14 and having a horizontal flange 22 extending forwardly of the flange 21. The front edge 23 of the flange 22 is straight to provide straight edge means for aligning the faces of the lumber pieces. Preferably, the front portion of the flange 22 is tapered or wedge-shaped in section to facilitate entry of the flange between adjacent layers of lumber in a stack.

The row of pins 12 is parallel to and spaced beneath the flange 22 and the pins 12 are secured to the flange 21 and extend horizontally and forwardly therefrom. The pins have sharp points 24 adapted to penetrate the lumber to seize the same and each pin has a threaded portion 25 and a head 26 to facilitate securing the pins in threaded holes 27 formed in the flange 21. The straight edge 23 extends forwardly of the pins, so that the points 24 do not interfere with the lumber as it is being aligned by the straight edge.

The pins 12 are spaced below the flange 22 a predetermined distance so that, when the underside of the flange 22 rests on a row of lumber (FIG. 5), the pins are positioned to penetrate the selected row of lumber at the vertical midpoint. As shown herein, the pins are arranged to lift and space two rows of lumber at a time with the flange 22 resting on the upper row and the pins penetrating the lower row.

If desired, the flange 21 may be provided with several vertically spaced, parallel rows of threaded holes 27 to enable the pins to be mounted for handling lumber having various vertical dimensions at the end thereof, or other means could be provided for adjustably spacing the pins and the flange. Alternatively, the pusher bar may be detachably secured to the frame and several bars may be provided for use with the apparatus, each bar for a different size of lumber.

Figure 7:
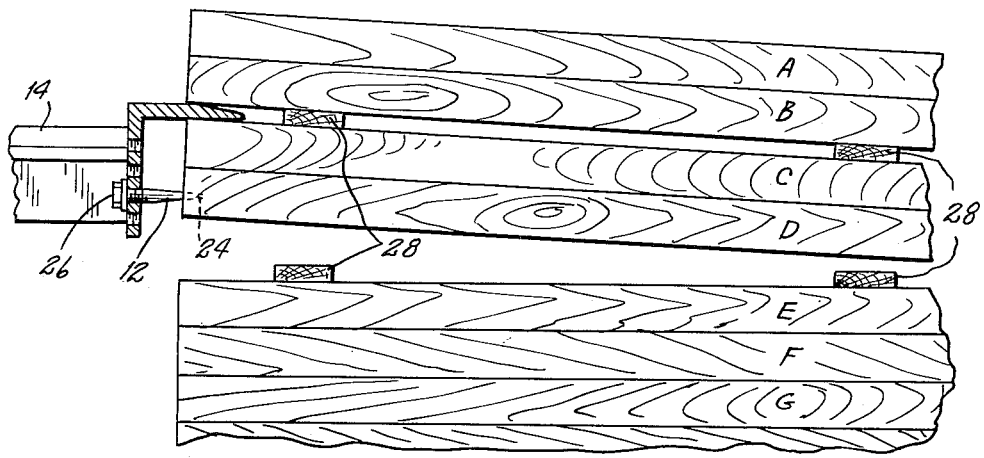

The operation of the apparatus is illustrated in FIGS. 5, 6 and 7. After the straps S have been removed from the bundle and the appartus has been mounted on the lift truck fork F, the lift truck is brought into position at one end of the bundle. The fork is then positioned with the straight edge 23 facing a row of lumber at about the vertical midpoint and the lift truck is operated to move forwardly and push the straight edge against the ends of the lumber to align the pices in each row.

Preferably, the bundle is worked on from top to bottom, the rows being referenced as A, B, C, D, E, etc., from top to bottom. At the start, in handling two rows at a time, and after all rows have been aligned, the pusher bar is lowered to cause the underside of flange 22 to rest on row A and is then pushed forward by the lift truck to cause the pins to penetrate the lumber in row B (FIG. 5). Since the ends of the lumber were first aligned, each pin penetrates the lumber to the same extent, whereby each piece is properly seized. The pusher bar is then raised to lift row B, and row A supported on it, to separate and space rows B and C sufficiently to enable spacing strips 28 to be placed therebetween manually by a helper (FIG. 6). After the strips 28 have been inserted, the pusher bar is lowered to enable row B to rest on the strips, and the lift truck is backed up to withdraw the pins. In this latter operation the chain 18, or other means for attaching the frame 10 to the truck, prevents the apparatus from being pulled away from the fork F.

Next, since row D has already been aligned, the flange 22 is positioned to enter the space between rows B and C and rest on row C (FIG. 7). By reason of the fact that the upper side of this flange 22 is tapered, the flange is readily positioned in the space without disturbing row B or fraying the lower corners of the lumber in row B. Also, the position of the flange 22 in back of the wedge has a thickness of about the same or slightly smaller dimension than that of the space provided by the strips 28, whereby row B rests on the upper surface of the flange 22 when rows C and D are lifted. This arrangement has the advantage that the pins are relied upon to lift only two rows of lumber and need not lift all rows above these two. This takes weight from the pins, which weight would otherwise tend to bend the pin points and render them ineffective for further use.

The operation is continued until all pairs of rows have been so separted. In general, lumber having a thickness of two inches, such as 2 x 4's, 2 x 6's, etc. are raised in pairs, while lumber having a greater thickness, such as 3 x 4's, 3 x 6's, 3 x 8's, etc., are raised in single layers.

If desired, the lift truck may be brought around to the other end of the bundle and the operation may be repeated to insert spacing strips adjacent that end, although this not ordinarily required because the lumber can be raised sufficiently at one end to enable strips to be inserted adjacent the opposite end.

From the foregoing description, it will be seen that the present invention provides apparatus and a method for rearranging bundles of lumber to space the same in a simple, practical, and time and labor saving manner. The apparatus is economical in construction and its cost is quickly repaid by the savings it effects. The apparatus is light enough to be handled manually when not in use, but yet is sufficiently rugged in construction to withstand the rough usage to which it is normally subjected.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. Apparatus for rearranging a bundle of lumber arranged in adjacent vertical stacks and horizontal rows, which apparatus comprises a frame constructed and arranged to be mounted on the lifting mechanism of a power operated lift truck, a horizontal pusher bar at the forward end of said frame having a straight edge for engaging the vertical end faces of lumber in the same horizontal row to align the end faces of the lumber in that row, a horizontal row of pins on said pusher bar spaced from said straight edge for gripping the end faces of lumber in a horizontal row and lifting that row of lumber above the row of lumber beneath it to enable spacing members to be placed between adjacent rows of lumber to separate the adjacent rows.

2. Apparatus according to claim 1, wherein said straight edge is on a horizontal flange which extends forwardly of said pins and said flange is above said row of pins a vertical distance to enter the space between separated adjacent rows of lumber.

3. Apparatus according to claim 2, wherein means are provided for adjusting the vertical distance between said flange and said row of pins to accommodate lumber having various vertical dimensions at the end face.

4. Apparatus according to claim 1, wherein said frame has portions for receiving the forks of the lifting mechanism.

5. Apparatus according to claim 4, wherein said frame includes front and rear sections and means for pivotally connecting said sections.

6. Apparatus according to claim 5, including means on said rear section for restraining said frame against movement in a direction forwardly of the lift truck.

7. Apparatus according to claim 1, including means for restraining the frame against movement in a direction forwardly of the lift truck.

References Cited in the file of this patent

UNITED STATES PATENTS

| | | |
|---|---|---|
| 867,630 | Wood | Oct. 8, 1907 |
| 2,181,357 | Chipman | Nov. 28, 1939 |
| 2,427,104 | Hosler | Sept. 9, 1947 |
| 2,495,987 | Seaberg | Jan. 31, 1950 |
| 2,665,019 | Lorimer | Jan. 5, 1954 |
| 2,717,089 | Hebert | Sept. 6, 1955 |
| 2,735,563 | Kelly | Feb. 21, 1956 |
| 2,827,184 | Mueller | Mar. 18, 1958 |
| 2,828,880 | Perry | Apr. 1, 1958 |
| 2,843,278 | Qveflander | July 15, 1958 |
| 2,873,873 | Fowler | Feb. 17, 1959 |
| 2,896,805 | Rigsby | July 28, 1959 |

FOREIGN PATENTS

| | | |
|---|---|---|
| 801,297 | Germany | Jan. 4, 1951 |